May 5, 1942.  J. SCHULMAN  2,281,806
AUTOMOBILE ATTACHMENT
Filed Feb. 8, 1941   2 Sheets-Sheet 1

Inventor

Joseph Schulman

By Clarence A. O'Brien

Attorney

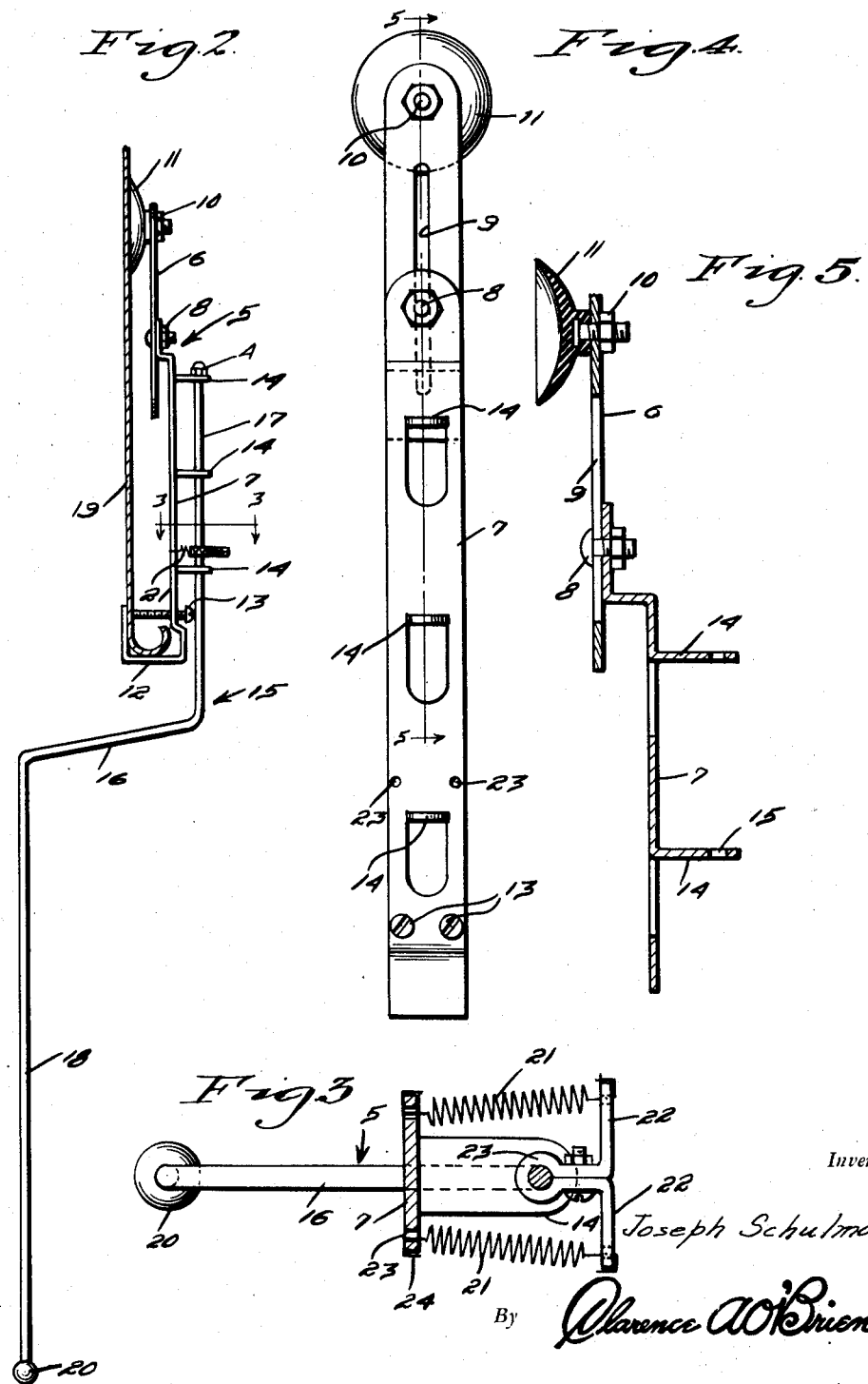

Patented May 5, 1942

2,281,806

UNITED STATES PATENT OFFICE 2,281,806

AUTOMOBILE ATTACHMENT

Joseph Schulman, Los Angeles, Calif.

Application February 8, 1941, Serial No. 378,068

3 Claims. (Cl. 116—28)

This invention relates to attachments for automobiles and has as its objects the provision of a device which may be readily mounted on an automobile body to prevent fenders from being scraped, scratched, or dented by objects such as high curbs, the sides of buildings, and the like near which the car is being maneuvered, as, for example, is being parked; and also, under such conditions, to prevent the side walls of the tires of the vehicle from being bruised, scuffed, damaged, and in the case of white wall tires, dirtied, as often happens because the driver of the vehicle fails to cut the wheels thereof sharply enough to prevent the sides of the tire casing striking the curb or similar structure; and to assist the driver in parking the vehicle in a manner as to allow him sufficient turning space between the front wheel and the curb to facilitate his driving of the vehicle away from such curb or obstruction.

A further object of the invention is to provide a device of this character which is comparatively simple in construction and which can be readily applied to or removed from the fender or other desired part of the vehicle body.

The invention together with its objects and advantages will be best understood from a study of the following description taken in connection with the accompanying drawings wherein—

Figure 2 is a detail sectional view taken substantially on the line 2—2 of Figure 1.

Figure 3 is a horizontal sectional view taken substantially on the line 3—3 of Figure 2.

Figure 4 is an elevational view of the bracket forming part of the invention.

Figure 5 is a fragmentary detail sectional view through the bracket and taken substantially on the line 5—5 of Figure 4.

Figure 1:
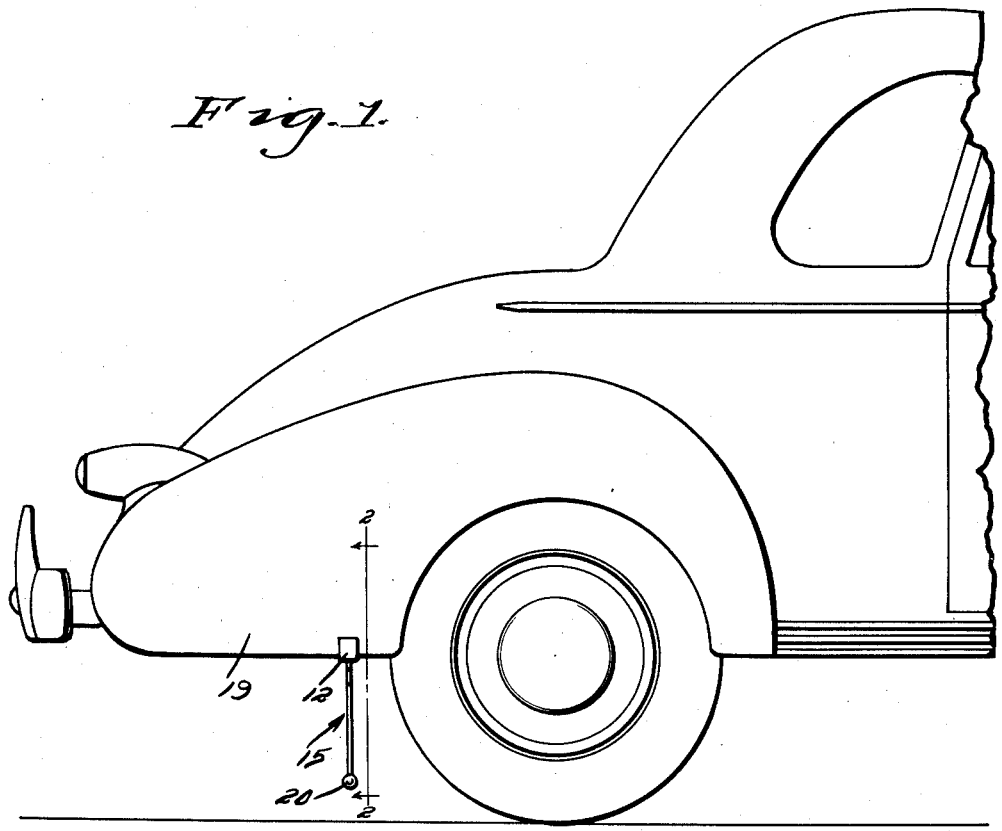
Figure 1 is a view illustrating the application of the invention, a fragmentary portion of an automobile in side elevation being shown, and the invention being illustrated as applied to the right rear fender of the vehicle.

Referring more in detail to the drawings it will be seen, in accordance with the present invention, that there is provided an attaching or mounting bracket, the same being indicated generally by the reference numeral 5. In the preferred embodiment thereof the bracket comprises a pair of narrow elongated bracket plates 6 and 7 that are secured in longitudinal adjustment relative to one another through the medium of a nut-equipped bolt 8 provided on one end of the bracket plate 7 and having a working engagement in a slot 9 provided longitudinally in the bracket plate 6.

At one end thereof the plate 6 has secured thereto, through the medium of bolt and nut means 10, a suction cup 11, while the bracket plate 7 at its free end is formed into a substantial U to provide a clamp 12 with which are cooperable clamping screws 13 that are threaded through openings provided therefor in the plate 7.

The plate 7 has struck out therefrom any desired number of lugs 14 that are provided with apertures 15 to accommodate for rotative and vertical shifting movement a contact or guide rod indicated generally by the reference numeral 15.

As shown in Figure 2 the guide rod 15 may be formed from a single length of metal rod or other suitable material bent intermediate its ends as at 16 and having one offset end 17 trained through the openings 15 in the lugs 14 and the other offset end, 18, disposed for position in a vertical plane outwardly from the plane of the automobile fender 19 so as to come in contact with a curb or other object before such fender or the wheel of the automobile might do so.

On the end 17 thereof the rod is equipped with a stop nut 4 to cooperate with the uppermost lug 14 in suspending the rod 15 from the bracket. At the free extremity thereof the end 18 of the rod is provided with a head 20 that is preferably ball-shaped and which in the majority of cases will come into contact with the curb or other object. By having the end 20 enlarged into the form of a ball or like formation, the same will be able to withstand considerable wear and rough usage.

For yieldably retaining the rod 15 against free rotation in either direction, and against free vertical up and down movement, there are provided a pair of coil springs 21. At one end thereof the coil springs are suitably engaged with the apertured ends of oppositely extending terminals 22 of a split clamp 23 that embraces the end portion 17 of the rod, as clearly shown in Figures 2 and 3. The springs 21 have one end thereof anchored to the bracket plate 7 in the manner clearly shown in Figure 3 wherein it will be seen that the plate 7 is provided with apertures 23 and the last-named ends of the springs 21 are provided with integral hooks 24 that engage the apertured portions of the bracket plate 7 as illustrated.

From the foregoing it will be seen that the springs 21 will tend to hold the rod 15 in an intermediate position against rotation either to the right or to the left, and also will exert a downward pull urging the rod 15 downwardly against any action on the rod tending to push the rod upwardly, as when the lower end of the rod might ride over the top surface of a curbing or similar obstruction.

In using the device the bracket 5 is mounted on, for example, the right rear fender 19 of the automobile body by engaging the clamp 12 of the bracket with the lower edge of the fender as best shown in Figure 2 from the inboard side of the fender 19, and the suction cup 11 being pressed against the inboard surface of the fender 19; after which the screws 13 are threaded into binding engagement with the fender.

With the bracket 5 thus secured to the fender the rod 15 will depend therefrom with the offset 16 extending outwardly beyond the outer side or exterior of the fender 19 a suitable distance and the end 18 of the rod thus positioned to come into contact with a wall, curbing or the like before any such contact would be made therewith by the fender or wheel of the vehicle.

With the end 18, or the extremity 20 of the end 18 of the rod thus coming into contact with such an obstruction, the scraping sound of the rod rubbing against such obstruction is transmitted through the body of the vehicle to the driver, who, being thus apprised, may then correct the apparent error in judgment.

Thus it will be seen that with a device of this character there is little likelihood of a fender, or other part of the vehicle body being scraped or otherwise marred or damaged by contact with high curbs, side walls of buildings, or other obstructions, while at the same the possibility of scuffing and otherwise damaging the side walls of the tires of vehicles is reduced to a minimum.

Figure 7:
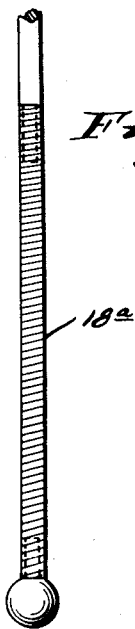
Figure 7 is a fragmentary detail elevational view of the contact or guide rod, showing a slightly modified form thereof.
Figure 6:
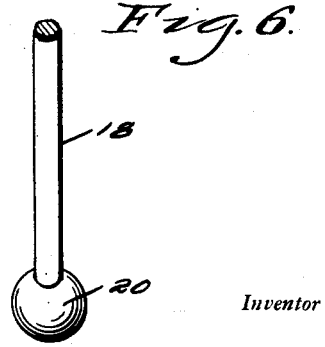
Figure 6 is a perspective view of the free end portion of the contact or guide rod forming part of the invention.

As shown in Figure 7, a modified form of contact or guide rod may be employed, and the same in the form shown in Figure 7 is characterized by having the lower end portion thereof, indicated by the reference numeral 18a, formed of a tightly coiled wire; or if desired the lower portion of the rod, as shown in Figure 8, and therein indicated by the reference numeral 18b, may be a section separate and distinct from the upper end of the rod and secured in a detachable manner to said upper end of the rod through the medium of a coupling 19 of rubber or other elastic material.

It is thought that the manner of attaching the device to the vehicle, its simplicity, and its many advantages will be all clear to those skilled in the art without further detailed explanation thereof.

It is to be understood that while I have herein illustrated and described a preferred embodiment of the invention, I claim all such forms of the invention to which I am entitled in view of the prior art and scope of the appended claims.

Having thus described the invention what is claimed as new is:

1. A warning signal for motor vehicles comprising a bracket adapted to be attached to the fender of a motor vehicle and provided at one end thereof with clamping means for positively engaging an edge portion of the fender, and at an opposite end thereof with a suction cup for detachably securing the second named end of the bracket on the fender remote from the edge of the latter, said bracket adapted to be mounted at the inner side of the fender to be concealed thereby and also having vertically spaced guide elements projecting therefrom, a curb contacting rod having an upper end engaged with said guide elements and vertically and rotatably movable relative to said bracket, said curb contacting rod having the lower end thereof offset relative to the first named end and disposed in a vertical plane outwardly with respect to the vertical plane of the fender, a clamp fixedly embracing the first named end of said curb contacting rod, and spring means engaged with said clamp and said bracket yieldably retaining the rod against rotation in either direction and also yieldably urging the rod downwardly for contact with a curb for transmitting, upon contact of the rod with the curb, a warning sound to the body of the vehicle.

2. In a motor vehicle, in combination with the fender thereof, of a bracket disposed at the inner side of the fender and provided at one end thereof with clamp means engaging an edge of the fender and at an opposite end thereof with suction cup means engaging the body of the fender, a curb contacting rod pivoted in an upright position on the bracket and shiftable vertically relative to the bracket, and means including a spring connected to said bracket and a clamp connected to said spring and rod for yieldably retaining the rod against rotation in either direction and normally yieldably urging the rod downwardly for contact with a curb for transmitting, upon such contact, a warning sound to the motor vehicle body.

3. A device for transmitting a warning sound to the body of an automobile comprising, a curb contacting rod, a longitudinally extensible bracket provided at one end thereof with a clamp, and at an opposite end thereof with a suction cup respectively cooperable with a part of an automobile for securing the bracket thereon, said clamp also being provided with guide means in which the said curb contacting rod has a working fit for movement perpendicularly and rotatably relative to the bracket, and spring means connected with the rod and the bracket yieldably exerting lateral pull on the rod in opposing directions for normally retaining the rod against rotation, and also exerting a downward pull on the rod for yieldably urging the rod downwardly into position for having the lower end thereof contacting a curb or analogous obstruction approached by the vehicle.

JOSEPH SCHULMAN.